(12) United States Patent
Hwang et al.

(10) Patent No.: US 8,279,855 B2
(45) Date of Patent: Oct. 2, 2012

(54) METHOD FOR DIALING BETWEEN INTERNET EXTENSIONS

(75) Inventors: Shaw Hwa Hwang, Taipei (TW); Yu Che Wang, Taipei (TW); Shun Chieh Chang, Taipei (TW); Kuan Lin Chen, Taipei (TW); Chi Jung Huang, Taipei (TW); Li Te Shen, Taipei (TW); Ben Chen Liu, Taipei (TW)

(73) Assignee: National Taipei University of Technology, Taipei (TW)

( * ) Notice: Subject to any disclaimer, the term of this patent is extended or adjusted under 35 U.S.C. 154(b) by 543 days.

(21) Appl. No.: 12/585,904

(22) Filed: Sep. 29, 2009

(65) Prior Publication Data

US 2010/0329240 A1    Dec. 30, 2010

(30) Foreign Application Priority Data

Jun. 30, 2009  (TW) ................. 98121949 A

(51) Int. Cl.
   *H04L 12/66*  (2006.01)
(52) U.S. Cl. ..................................... 370/352
(58) Field of Classification Search ............. 370/401, 370/388, 400, 352–356
   See application file for complete search history.

(56) References Cited

U.S. PATENT DOCUMENTS

| 6,909,708 | B1 * | 6/2005 | Krishnaswamy et al. ..... 370/352 |
| 6,956,848 | B1 * | 10/2005 | Keung et al. ................ 370/356 |
| 7,072,459 | B2 * | 7/2006 | Murai .......................... 379/231 |
| 7,110,393 | B1 * | 9/2006 | Tripathi et al. ............... 370/352 |
| 7,245,609 | B2 * | 7/2007 | D'Eletto ...................... 370/352 |
| 7,388,946 | B1 * | 6/2008 | Mussman et al. .......... 379/15.01 |
| 7,660,321 | B2 * | 2/2010 | Cortes et al. ................. 370/412 |
| 7,664,251 | B2 * | 2/2010 | Lowmaster ................... 379/225 |
| 8,072,967 | B2 * | 12/2011 | Rosenberg et al. ........... 370/352 |
| 2008/0123836 | A1 * | 5/2008 | Flensted-Jensen et al. ... 379/229 |
| 2009/0070434 | A1 * | 3/2009 | Himmelstein ................ 709/217 |
| 2009/0219925 | A1 * | 9/2009 | Donovan ...................... 370/352 |
| 2009/0279683 | A1 * | 11/2009 | Gisby et al. .............. 379/201.02 |
| 2010/0124316 | A1 * | 5/2010 | Hwang et al. ............... 379/88.17 |
| 2010/0189099 | A1 * | 7/2010 | Bae et al. ..................... 370/352 |
| 2011/0103576 | A1 * | 5/2011 | Partington et al. ............ 379/419 |

* cited by examiner

*Primary Examiner* — Asad Nawaz
*Assistant Examiner* — Syed S Ali
(74) *Attorney, Agent, or Firm* — Bacon & Thomas, PLLC

(57) ABSTRACT

A method for dialing between Internet extensions is disclosed. When dialing between Internet extensions, just dial the switchboard phone number of SIP proxy server plus "-" and then dial the extension phone number of the opposite Internet extension directly. It is not necessary to use a voice guidance for asking dialing of the extension phone number of the opposite Internet extension.

1 Claim, 4 Drawing Sheets

etc. A station 3 connects with a switchboard 31 of a university, a switchboard 32 of an elementary school … etc. The switchboard 31 has a phone number 0227712171, and manages some conventional extensions 2178. The switchboard 32 has a phone number 0227710846, and manages some conventional extensions 6000.

A conventional extension 2178 cannot dial directly to a conventional extension 6000. The conventional extension 2178 has to dial the phone number 0227710846 of the switchboard 32, after hearing a voice guidance, then dial the number "6000" for being connected with the conventional extension 6000.

SUMMARY OF THE INVENTION

The object of the present invention is to provide a method for dialing between Internet extensions, comprises:
an upper SIP proxy server;
a plurality of lower SIP proxy servers, each of the lower SIP proxy servers has a switchboard phone number;
each of the lower SIP proxy servers manages a plurality of Internet extensions, and each of the plurality of Internet extensions has an extension phone number;
the upper SIP proxy server connects with the plurality of lower SIP proxy server by Internet;
each of the plurality of lower SIP proxy server connects with the plurality of Internet extensions under management by Internet;
said method comprises: when dialing between the Internet extensions, just dial the switchboard phone number of the opposite SIP proxy server plus "-" and then dial the opposite extension phone number directly; it is not necessary to use a voice guidance for asking dialing of the opposite extension phone number.

When the lower SIP proxy server is waiting for an Internet telephone message, the processes are as below:
a. once there is an Internet telephone message coming in, the lower SIP proxy server will analyze if it is a "call-in" or "call-out" message;
b. if the message is a call-in message, then check if there is a "-"; If there is a "-", then delete the "-" and the switchboard phone number before the "-", only remain the extension phone number after the "-", and send the message to the Internet extension; If there is no "-", then send the message directly to the Internet extension, and return for waiting the next message;
c. if the message is a call-out message, then add the switchboard phone number of the lower SIP proxy server and "-" before the extension phone number, send the message to the upper SIP proxy server, and then return for waiting the next message.

DETAILED DESCRIPTIONS OF THE PREFERRED EMBODIMENTS

Introduction to SIP

A message is the basic unit for SIP to set up a speech communication. The message can be classified into "request" message and "response" message. A request is an SIP message from a client to a server to express the purpose of the client; while a response is an SIP message from a server to a client to answer the request from the client.

SIP request messages used in the present invention are shown in table 1 as below.

TABLE 1

SIP request messages used in the present invention

| requests | descriptions |
| --- | --- |
| INVITE | A client requests setting up a speech communication. |
| BYE | To end up a successful speech communication. A request terminal for Invite or a receiving terminal can issue such request. |
| ACK | A request that the client (issuing an Invite) confirms to the server that a final response is received. |
| From | Shows the phone number of the request terminal. |
| To | Shows the phone number of the receiving terminal. |

SIP response messages used in the present invention are shown in table 2 as below.

TABLE 2

SIP response messages used in the present invention

| responses | descriptions |
| --- | --- |
| 100~199 | The server has received a request, and the request is processed. |
| 180 Ringing | The server causes the request terminal to ring. |
| 200~299 | The server accepts the request from the client. |
| 200 OK | "200 OK" from the server means the "INVITE" is accepted, "200 OK" from the request terminal means the "BYE" is accepted, and the speech communication is ended. |

Descriptions of the Internet Phone System of the Present Invention

Figure 1:
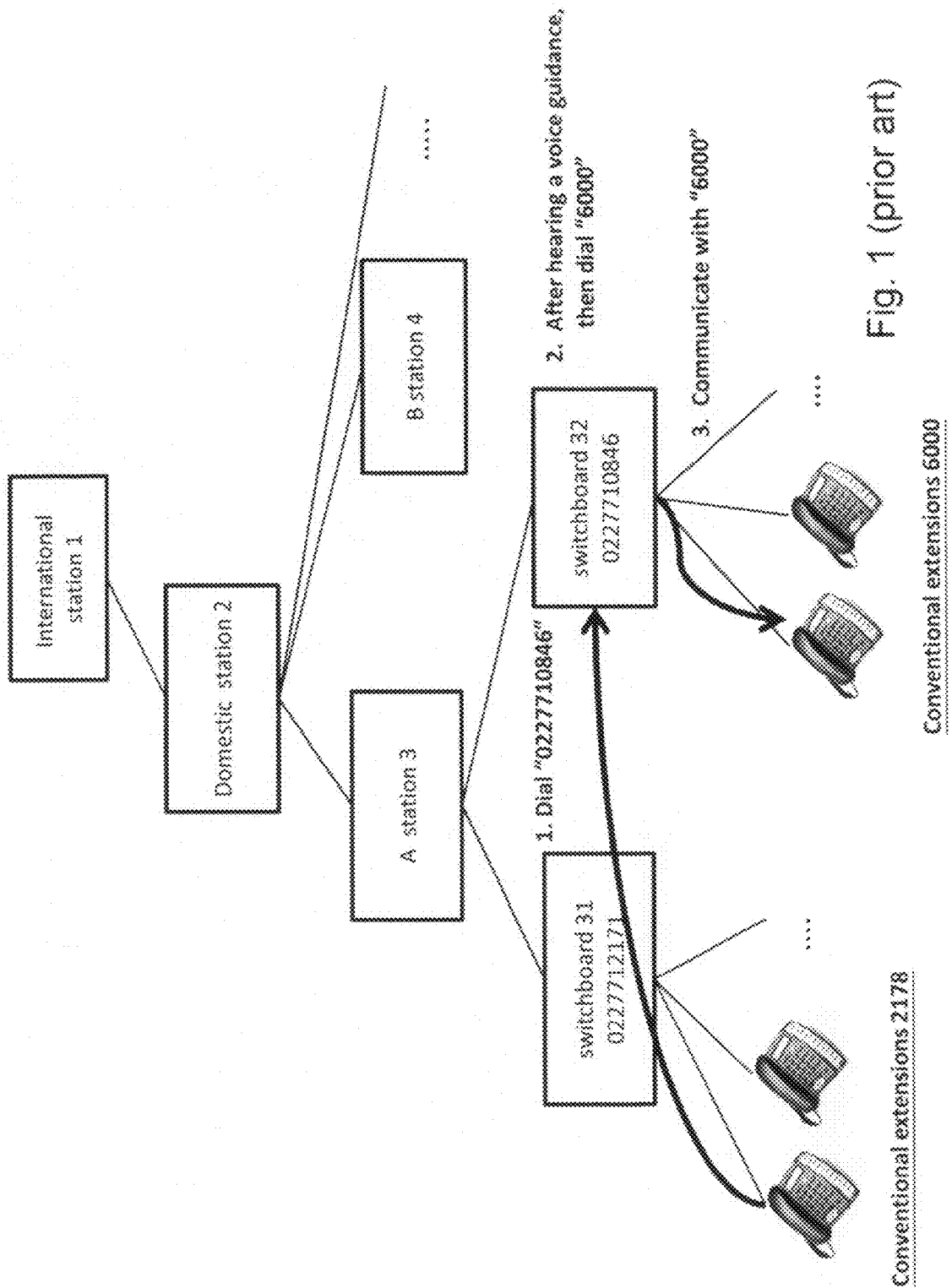
FIG. 1 shows the diagram of a conventional telephone system.
Figure 2:
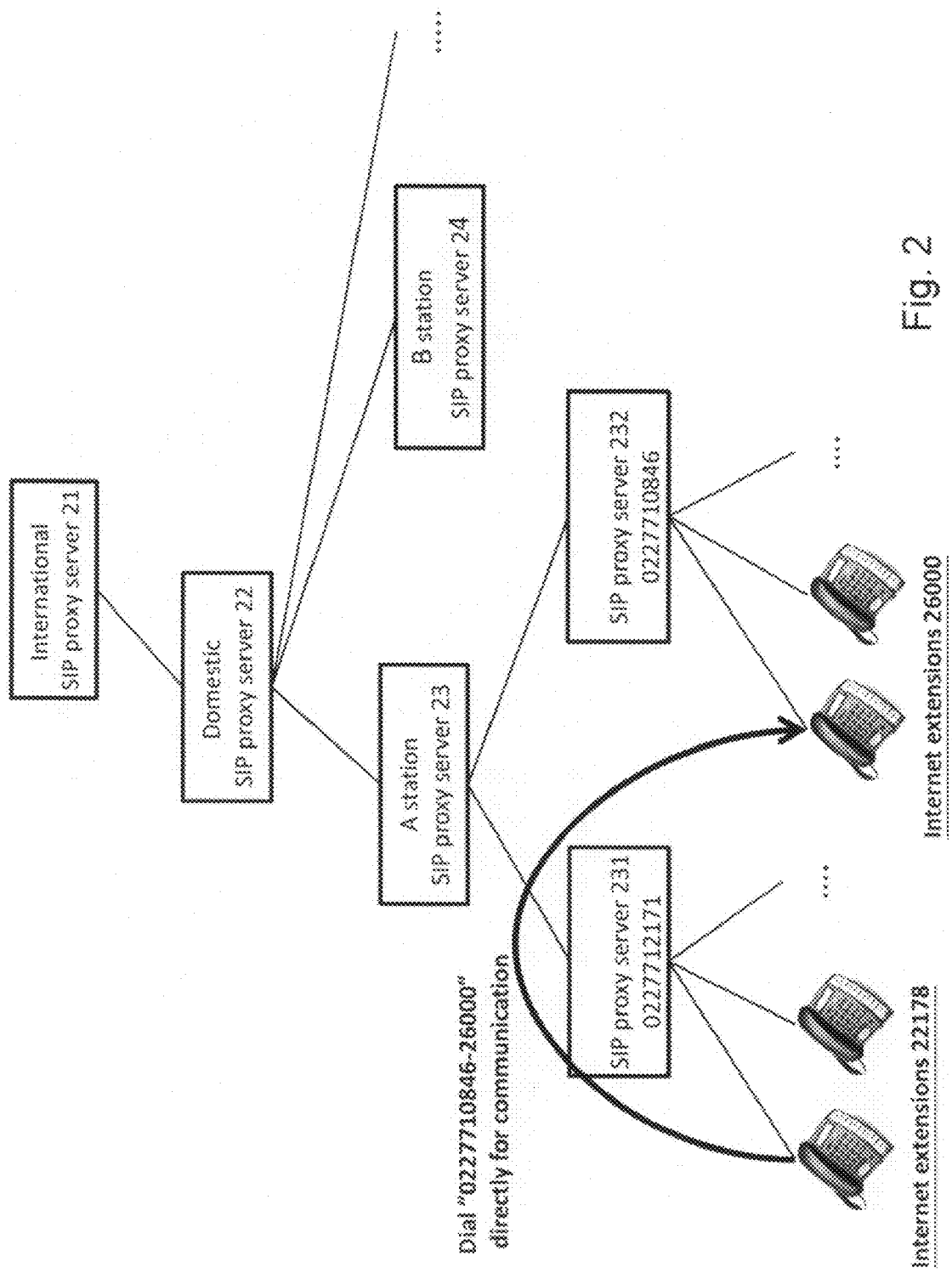
FIG. 2 shows the diagram of an Internet telephone system according to the present invention.

Referring to FIG. 2, it shows the Internet telephone system of the present invention. An international SIP proxy server 21 connects with a domestic SIP proxy server 22. The domestic SIP proxy server 22 connects with A station SIP proxy server 23, B station SIP proxy server 24 . . . etc. A station SIP proxy server 23 connects with SIP proxy server 231 of a university, SIP proxy server 232 of an elementary school . . . etc. All of the connections are through Internet. SIP proxy server 231 has a phone number 0227712171, and manages some Internet extensions 22178. SIP proxy server 232 has a phone number 0227710846, and manages some Internet extensions 26000.

When an Internet extension 22178 wants to connect with an Internet extensions 26000, just dial 0227710846-26000 directly, it is not necessary to use a voice guidance for asking dialing of the phone number 26000 of the opposite Internet extension.

Figure 3:
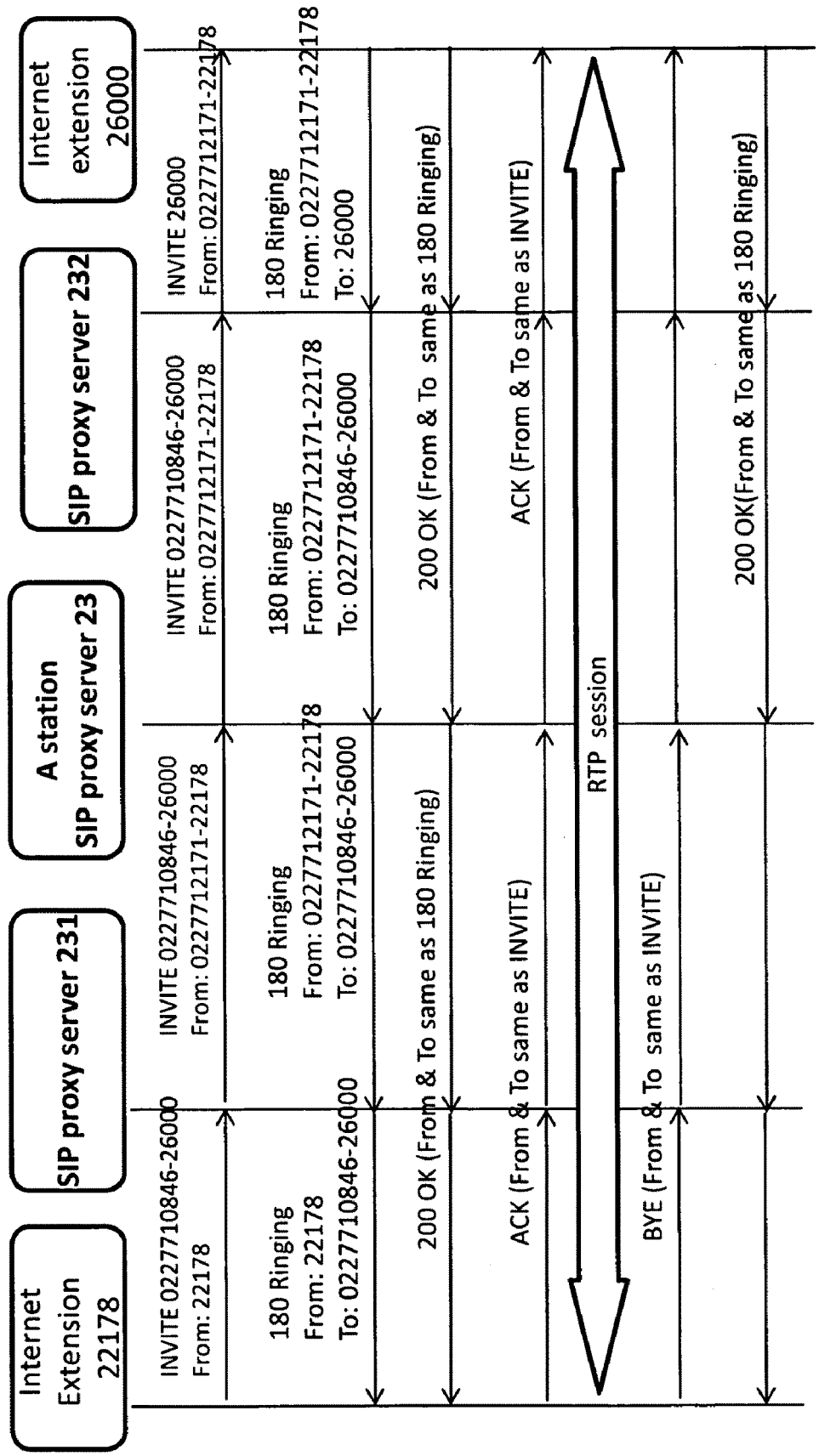
FIG. 3 shows the flow chart for describing how the Internet extension dials with each other according to the present invention.

Referring to FIG. 3, it shows the message flow chart for dialing between Internet extensions according to the present invention. When the Internet extension 22178 wants to connect with the Internet extension 26000, just dial 0227710846-26000 to send a message "INVITE 0227710846-26000; From: 22178". This message passes through SIP proxy server 231 to be changed into "INVITE 0227710846-26000; From: 0227712171-22178", and then passes through A station SIP proxy server 23 for maintaining "INVITE 0227710846-26000; From: 0227712171-22178, thereafter passes through SIP proxy server 232 to be changed into "INVITE 26000; From: 0227712171-22178", finally reaches the Internet extension 26000.

The Internet extension 26000 will then send a message "180 Ringing From: 0227712171-22178 To: 26000" to SIP proxy server 232 to be changed into "180 Ringing From: 0227712171-22178 To: 0227710846-26000", and then passes through A station SIP proxy server 23 for maintaining "180 Ringing From: 0227712171-22178 To: 0227710846-26000", thereafter passes through SIP proxy server 231 to be changed into "180 Ringing From: 22178 To: 0227710846-26000", finally reaches the Internet extensions 22178.

If the Internet extension 26000 is picked up by someone, then a message "200 OK From: 0227712171-22178 To: 26000" will be sent to SIP proxy server 232 for being changed into "200 OK From: 0227712171-22178 To: 0227710846-26000", and then passes through A station SIP proxy server 23 for maintaining "200 OK From: 0227712171-22178 To: 0227710846-26000", thereafter passes through SIP proxy server 231 to be changed into "200 OK From: 22178 To: 0227710846-26000", and finally reaches the Internet extension 22178.

Therefore the Internet extension 22178 sends a message "ACK 0227710846-26000; From: 22178", and then passes through SIP proxy server 231 to be changed into "ACK 0227710846-26000; From: 0227712171-22178", thereafter passes through A station SIP proxy server 23 for maintaining "ACK 0227710846-26000; From: 0227712171-22178", then passes through SIP proxy server 232 for being changed into "ACK 26000; From: 0227712171-22178", finally reaches the Internet extension 26000.

After that the Internet extension 22178 communicates with the Internet extension 26000, and enters RTP (Real Time Transport Protocol) session, as shown in FIG. 3.

When the communication is ended, the internet extension 22178 is on-hook, a BYE message will be sent to the Internet extension 26000; while the Internet extension 26000 will answer with 200 OK message. The form of the BYE message is the same as that of the INVITE message, the form of the 200 OK message is the same as that of the 180 Ringing message.

Figure 4:
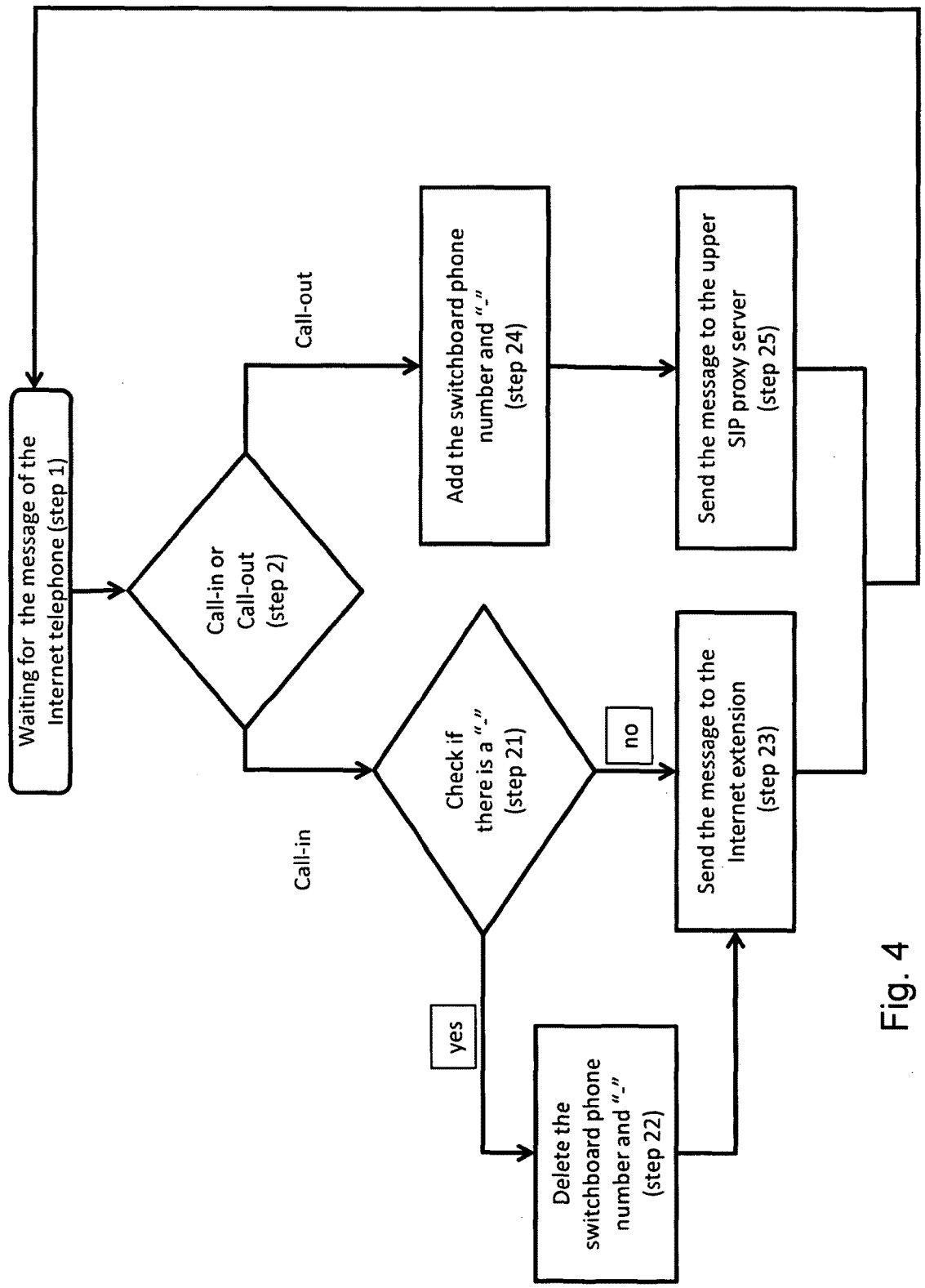
FIG. 4 shows the flow chart for describing how the SIP proxy server processes messages according to the present invention.

The flow chart in FIG. 4 describes how the SIP proxy server processes message in the present invention. SIP proxy server 231 of the university or SIP proxy server 232 of the elementary school is waiting for the message of the Internet telephone (step 1), once there is a message of the Internet telephone coming in, the SIP proxy server will analyze if it is a "call-in" or "call-out" message (step 2). A call-in message is a message calling from an upper Internet SIP proxy server; while a call-out message is a message calling from an Internet extension under its management.

If the message is a call-in message, then check if there is a "-" before the phone number of the acceptor (step 21). If there is a "-", then delete the "-" and the switchboard phone number before the "-", only remain the extension phone number after the "-" (step 22), and send the message to the Internet extension (step 23). If there is no "-", then send the message directly to the Internet extension (step 23), and return to step 1 waiting for the next message.

If the message is a call-out message, then add the switchboard phone number of the SIP proxy server and "-" before the extension phone number (step 24), send the message to the upper SIP proxy server (step 25), and then return to step 1 waiting for the next message.

The scope of the present invention depends upon the following claims, and is not limited by the above embodiments.

What is claimed is:

1. A method for dialing between Internet extensions comprises implemented on a system that includes an upper SIP proxy server and a plurality of lower SIP proxy servers, each of the lower SIP proxy servers having a switchboard phone number, wherein each of the lower SIP proxy servers manages a plurality of Internet extensions, each of the plurality of Internet extensions has an extension phone number, the upper SIP proxy server connects with the plurality of lower SIP proxy servers by Internet, and each of the plurality of lower SIP proxy server connects with the plurality of Internet extensions under management by the Internet and waits for an Internet telephone message, said method comprising the following steps:

a. once an Internet telephone message is received by one of the lower SIP proxy servers waiting for the Internet telephone message, the lower SIP proxy server receiving the Internet telephone message analyzes if it is a "call-in" or a "call-out" message;

b. if the message is a call-in message, then the lower SIP proxy server receiving the Internet telephone message checks if there is a "-"; if there is a "-", then the lower SIP proxy server receiving the Internet telephone message deletes the "-" and a switchboard phone number before the "-" to only leave an extension phone number after the "-", and sends the message to the Internet extension; if there is no "-", then the lower SIP proxy server receiving the Internet telephone message sends the message directly to the Internet extension and waits for a next message; and c. if the message is a call-out message, then the lower SIP proxy server receiving the Internet telephone message adds a switchboard phone number of the lower SIP proxy server and "-" before an extension phone number, sends the message to the upper SIP proxy server, and then waits for the next message;

whereby when dialing between the Internet extensions, after dialing the switchboard phone number of an opposite SIP proxy server plus "-", an opposite extension phone number is dialed directly so that it is not necessary to use a voice guidance for requesting dialing of an opposite extension phone number.

* * * * *